United States Patent [19]
Sato et al.

[11] Patent Number: 5,090,759
[45] Date of Patent: Feb. 25, 1992

[54] APPARATUS FOR GRIPPING AN OBJECT

[75] Inventors: Naomi Sato; Isao Watanabe; Hiroshi Fukuyama, all of Tokyo, Japan

[73] Assignee: Bridgestone Corporation, Tokyo, Japan

[21] Appl. No.: 655,262

[22] Filed: Feb. 13, 1991

Related U.S. Application Data

[63] Continuation of Ser. No. 404,925, Sep. 7, 1989, abandoned.

[30] Foreign Application Priority Data

Sep. 9, 1988 [JP] Japan ............................... 63-225795
Oct. 18, 1988 [JP] Japan ............................... 63-262134

[51] Int. Cl.$^5$ ........................... B25J 15/00; B66C 1/46
[52] U.S. Cl. ................................... 294/119.3; 269/22
[58] Field of Search ................. 294/63.2, 87.1, 90, 294/98.1, 99.1, 119.3; 269/22; 279/24, 4; 403/5; 285/97

[56] References Cited

U.S. PATENT DOCUMENTS

| 2,784,997 | 3/1957 | Baumann | 294/119.3 X |
| 2,929,653 | 3/1960 | Hund et al. | 294/119.3 |
| 3,831,995 | 8/1974 | Duncan | 294/119.3 |
| 3,835,633 | 9/1974 | Klein | 294/98.1 X |
| 4,079,980 | 3/1978 | Eichholz et al. | 294/119.3 X |

FOREIGN PATENT DOCUMENTS

| 2458567 | 5/1975 | Fed. Rep. of Germany | 294/119.3 |
| 1307942 | 9/1962 | France | 294/119.3 |
| 203864 | 11/1983 | German Democratic Rep. | 294/119.3 |
| 1382806 | 3/1988 | U.S.S.R. | 294/98.1 |

Primary Examiner—Johnny D. Cherry
Attorney, Agent, or Firm—Jordan and Hamburg

[57] ABSTRACT

A catching apparatus has a body to which an open ended inflatable cylindrical tube is affixed, for sealingly catching a fluid filled object. The fluid filled object is caught by the surface of the tube when air is supplied to the space between the tube and the body. An inflation limiting member is provided in a part of an area in which the tube inflates, in order to limit the inflation of the tube to a desired region.

1 Claim, 13 Drawing Sheets

APPARATUS FOR GRIPPING AN OBJECT

This application is a continuation of application Ser. No. 07/404,925, filed Sept. 7, 1989, now abandoned.

BACKGROUND OF THE INVENTION

1. Field of the Invention

The present invention relates to an apparatus for catching an object, having a body to which a cylindrical tube open at both ends thereof, inflatable when supplied with a fluid such as air fixed at both ends thereof as sealed, whereby the fluid-filled object is caught by the surface of the tube inflated as the fluid is supplied into a sealed space defined between the tube and the body.

2. Description of the Prior Art

Figure 1:
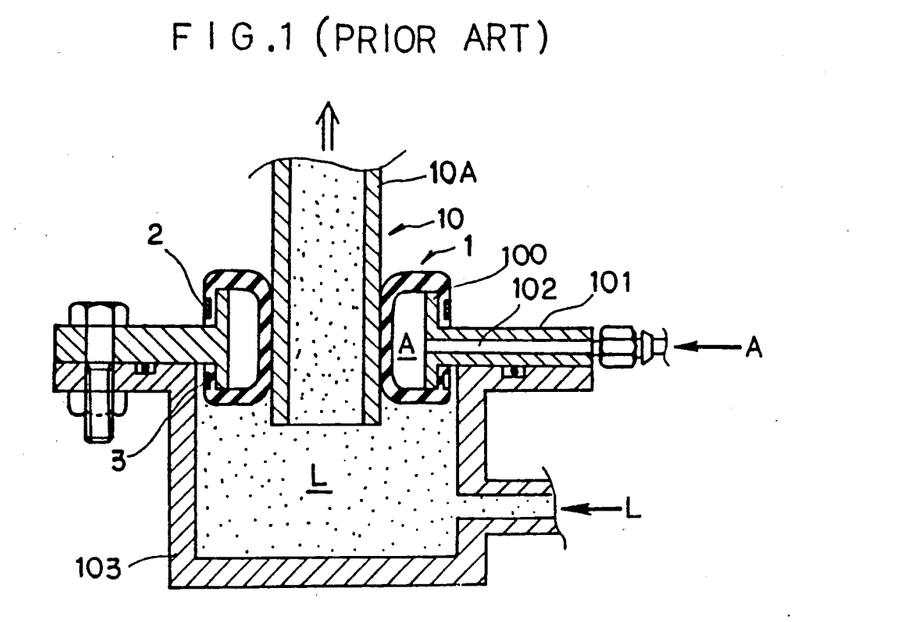
FIG. 1 is a sectional view showing the use of a typical conventional catching apparatus.

A typical conventional catching apparatus shown in FIG. 1 comprises a hollow cylindrical body 100, a flange 101 formed on the outer circumference of the body 100, an air passage 102 formed in the body and flange 101, a cylindrical tube 1 open at both ends thereof, inflatable when air is supplied and of which both ends are secured as sealed with calking rings 2 and 3, respectively, to the body 100, and a container 103 which is sealingly fixed to the flange 101. When a liquid L is supplied into an object 10 to be caught by this apparatus for the purpose of washing, the surface of contact between the tube 1 and the object 10 has to be sealed as the case may be.

Assume in this case that the pressure of the air A to be supplied into the tube 1 is $P_A$ and the pressure of the liquid L is $P_L$. When the pressures are so adjusted that $P_A$ is smaller than $P_L$, the liquid L in the container 103 will not leak out.

Figure 2:
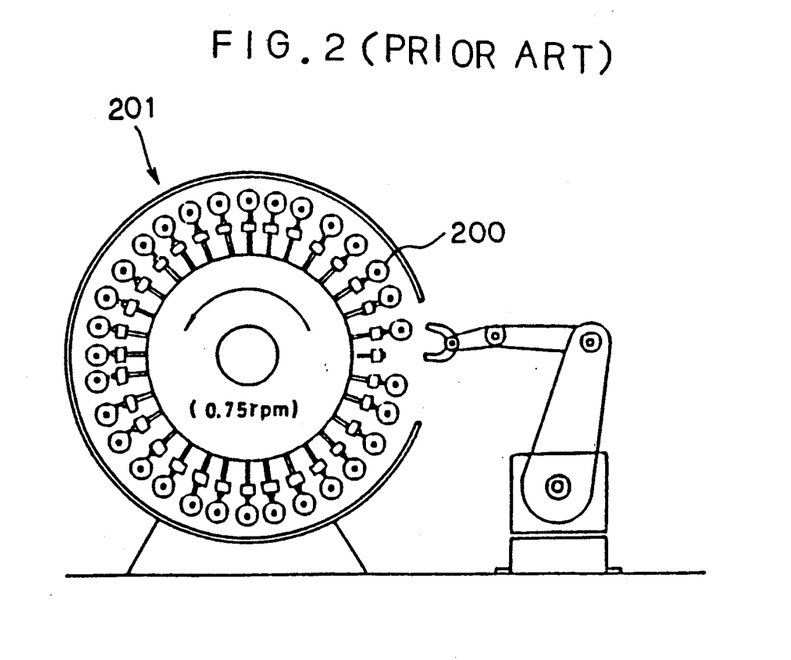
FIG. 2 is a schematic drawing of a dryer for the blood filters for artificial dialysis.
Figure 3:
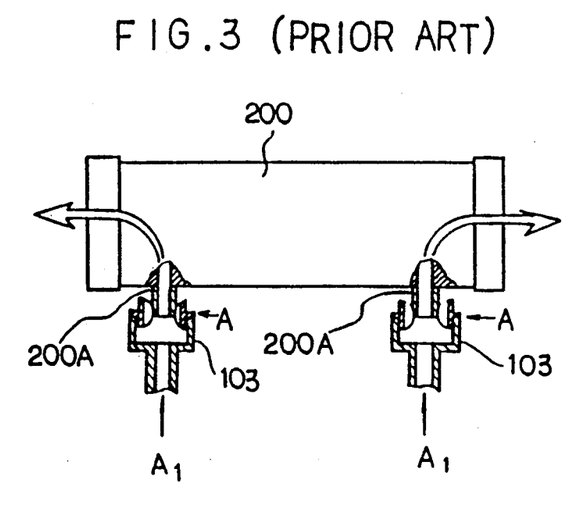
FIG. 3 is a front view showing the catching of the filter shown in FIG. 2 by the conventional catching apparatus.
Figure 4:
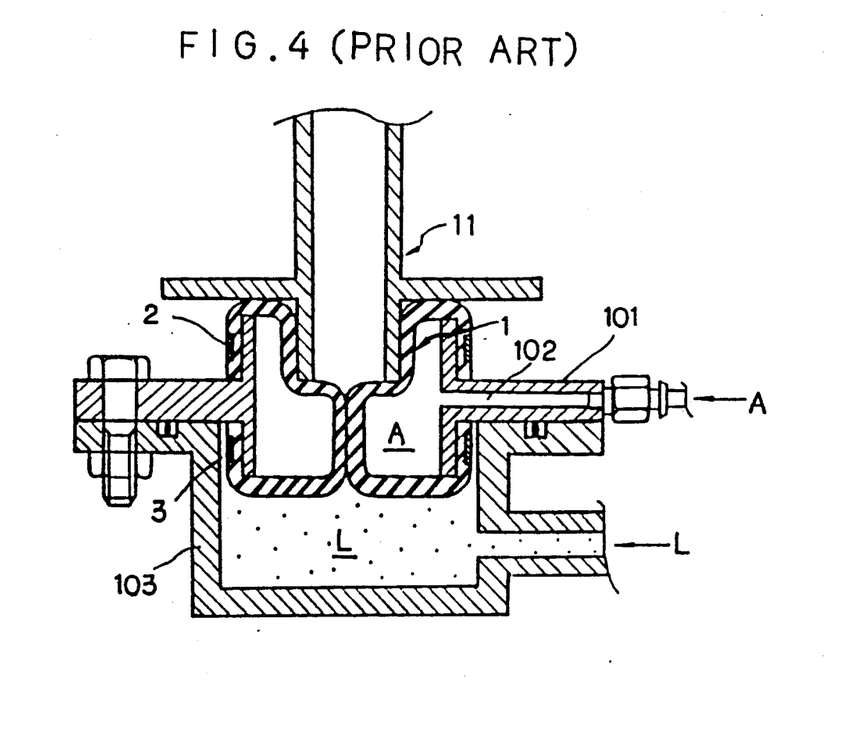
FIGS. 4 and 5 are sectional views, respectively, explaining the drawbacks of the conventional catching apparatus.
Figure 5:
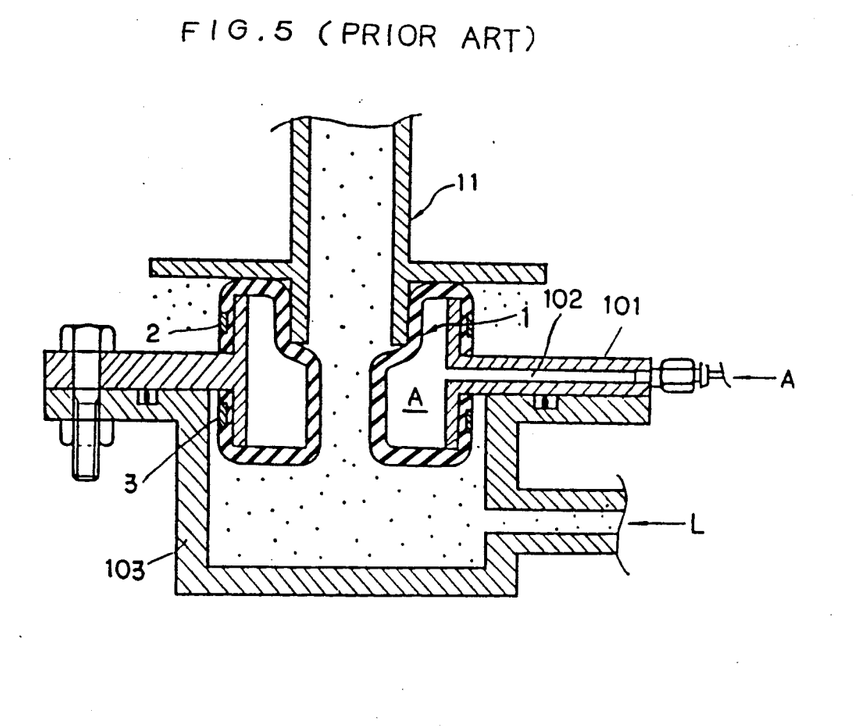
Figure 6:
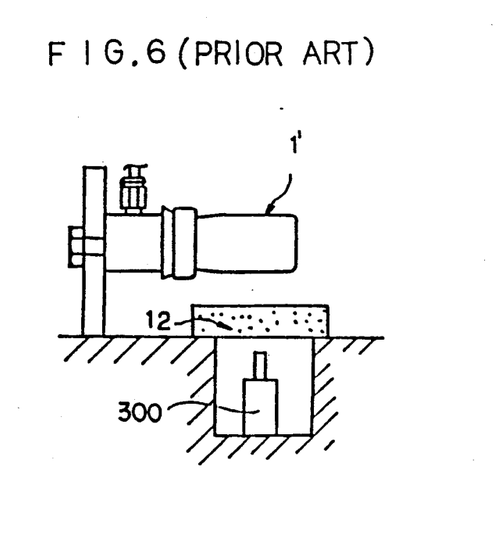
FIG. 6 is a side elevation showing another conventional catching apparatus of which the tube is about to be inflated.
Figure 7:
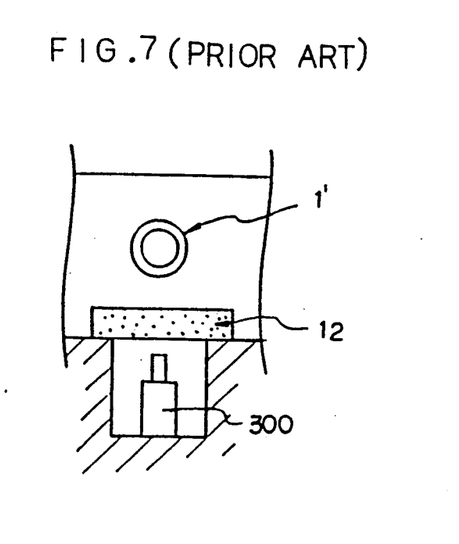
FIG. 7 is a front view of the conventional catching apparatus shown in FIG. 6.
Figure 8:
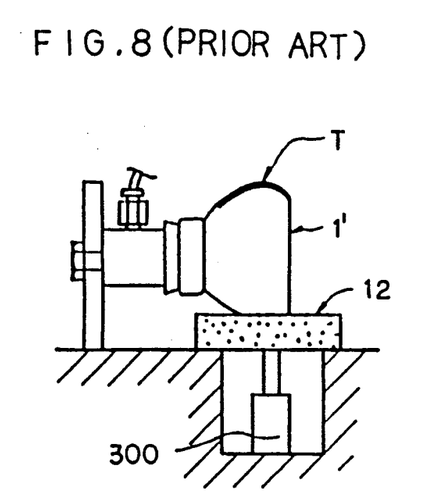
FIG. 8 is a side elevation showing the conventional catching apparatus in FIG. 6, of which the tube has been inflated.
Figure 9:
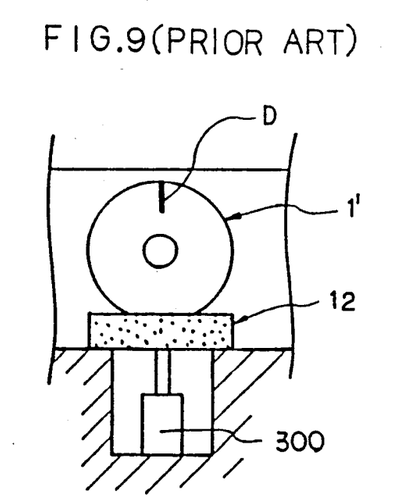
FIG. 9 is a front view of the conventional catching apparatus in FIG. 8.

The object 10 shown in FIG. 1 has a sufficiently long portion thereof which is to be caught by the tube 1; however, in case of an object of which such portion is short, for example, in case blood filters 200 for artificial dialysis are held by a multi-head catching apparatus inside a dryer as shown in FIGS. 2 and 3, the air-supply tubes 200A are so short in some cases that when the dry air $A_1$ is supplied into the filters 200, the air leaks out. If the pressure of the air A to be supplied into the tube 1 is raised for the purpose of preventing such air leak as well as for secure catching of the object 11, the tube 1 will close the opening of the object 11 as shown in FIG. 4, making it impossible to supply the liquid L (or the dry air $A_1$) into the object 11. On the contrary, if the pressure of the air A is reduced, the sealing becomes poor as shown in FIG. 5, resulting in leak-out of the liquid L. Note that even in case it is not necessary to supply the liquid L into the object, if the portion of the object to be caught by the catching apparatus is smaller than the tube, the object cannot positively be caught.

Figure 10:
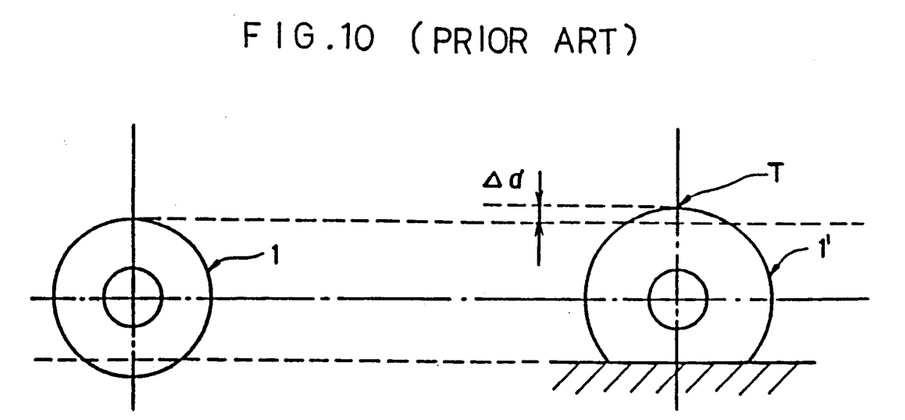
FIG. 10 is a drawing to explain the distortion which the tube incurs.

In another typical conventional catching apparatus shown in FIGS. 6 to 9, the tube is inflated outwardly and the inflated surface of the tube 1' is partially used to retain the object 12 which is to be inspected using a probe 300. Such conventional catching apparatus is not advantageous in that when the tube 1' is inflated, a large distortion is likely to occur at a point T on the inflated surface opposite to the surface which touches the object 12, resulting in a puncture of the tube 1' along the line D starting at the point T. When the tube 1' is freely inflated, it will expand as shown in the left illustration of FIG. 10, but when the object 10 is pressed, the tube diameter at the point T becomes larger by d as shown in the right illustration of FIG. 10 and also the distortion exceeds the allowable value.

SUMMARY OF THE INVENTION

Accordingly, the present invention seeks to provide an apparatus for catching an object or the like, which can positively catch even an object of which the portion to be caught by the catching apparatus is smaller than the tube, can securely catch even an object which is being supplied with a fluid, and also can securely hold an object with a part of the inflated tube surface.

To this end, the catching apparatus according to the present invention has provided, in a part of an area in which the tube inflates, a inflation limiting member which limits the inflation of the tube to within a desired range.

According to the present invention, the inflation limiting member is so provided as to be within a part of the area in which the tube inflates, so that when the fluid is supplied into the tube under such a pressure as provides a sealing between the tube and an object to be caught, there is a good sealing between the inflated tube surface in contact with the object while the latter and the tube inflated surface not in contact with the object is limited by the inflation limiting member from being inflated more than predetermined, whereby the object can be more securely caught by the tube and better sealed. Also, for using the catching apparatus to pres an object, such inflation limiting member may be provided on the opposite tube surface to the surface which is to be in contact with the object, whereby the tube can be improved against puncture and in durability.

These and other objects and advantages of the present invention will be better understood from the ensuing description made, by way of example, of the embodiments of the present invention with reference to the drawings.

DETAILED DESCRIPTION OF THE PREFERRED EMBODIMENTS

FIG. 13 (a) is a second embodiment of the present invention;

FIGS. 17 (a) and (b) are sectional views, respectively, of a sixth embodiment of the present invention;

FIGS. 30 (a) and (b) are front views, respectively, enlarged in scale, showing the portion indicated with E in FIG. 29;

DETAILED DESCRRIPTION OF THE PREFERRED EMBODIMENTS

Figure 11:
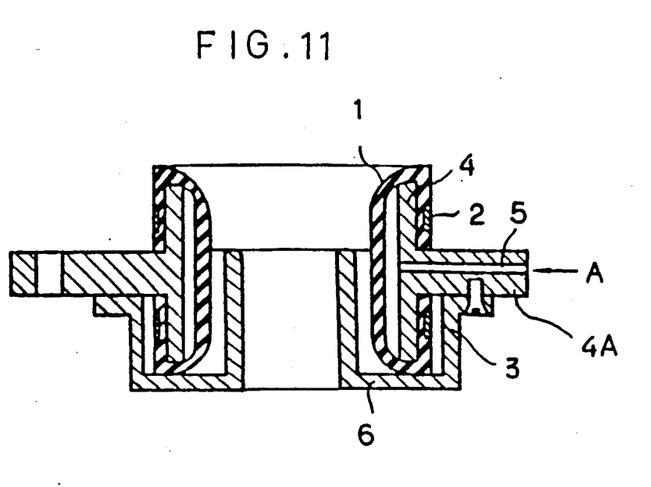
FIG. 11 is a sectional view of a first embodiment of the present invention.
Figure 12:
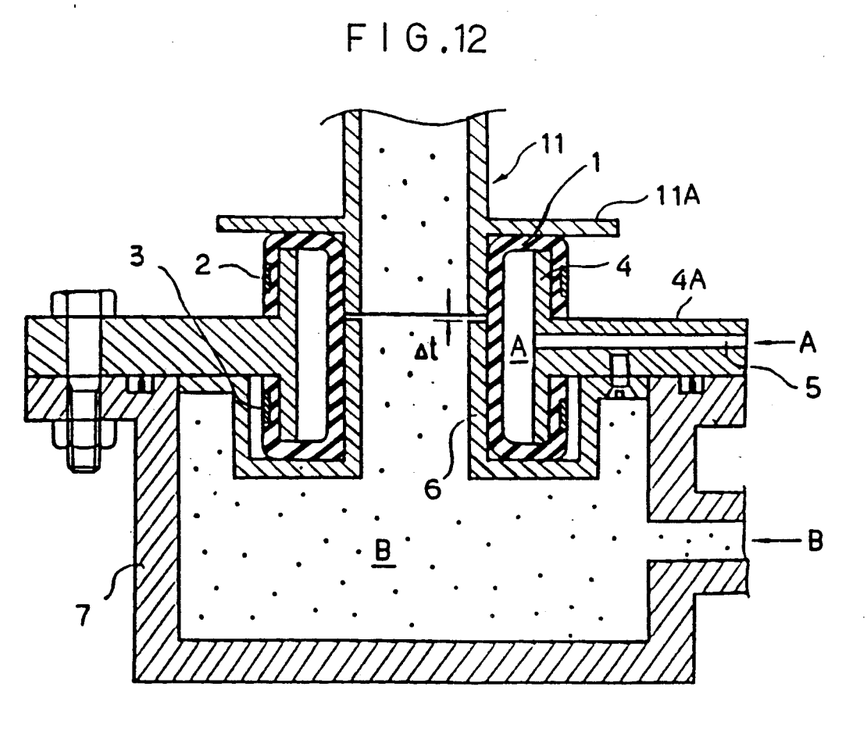
FIG. 12 is a sectional view showing an example use of the first embodiment.

According to the first embodiment shown in FIG. 11, the catching apparatus has a body 4 to which a cylindrical tube 1 open at both ends thereof is so fixed at both ends thereof that the inflation surface of the tube 1 is inside the body 1. The body 4 has formed therein a passage 5 to supply a fluid A such as air into the tube 1. The tube 1 is fixed at both ends thereof to the body 5 with calking rings 2 and 3. The passage 5 is formed also in a flange portion 4A of the body 4, and there is secured to the flange portion 4A an inflation limiting member 6 which limits the inflation of the tube 1. FIG. 12 shows the catching apparatus according to the first embodiment which is catching an object 11. The inside diameter of this object 11 is nearly the same as the inside diameter of the inflation limiting member 6. Since the object 11 has a flange 11A, the portion thereof which can be caught by the tube 1 is extremely short. The flange portion 4A of the catching apparatus shown in FIG. 11 is so fixed to a container 7 as sealed that a fluid B such as a liquid, dry air of the like flowing into the container is supplied into the object 11. The clearance $\Delta t$ between the upper end of the inflation limiting member 6 and the lower end of the object 11 is preferably zero, but these ends may have a slight clearance between them. As shown in FIG. 12, when the object 11 is caught by the tube 1, the fluid A is supplied into the tube 1 under a predetermined pressure so as to ensure an ample sealing between the tube 1 and object 11. At this time, the existence of the inflation limiting member 6 prevents the inflated surface of the tube 1 not in contact with the object 11 from closing the passage to the object 11, whereby the fluid B can be supplied into the object 11.

Figure 13A:
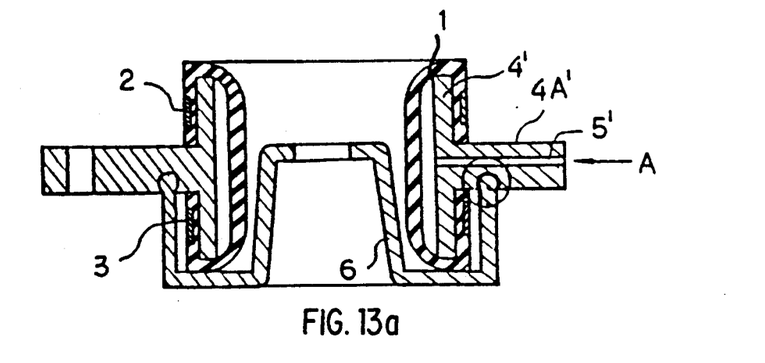
Figure 13B:
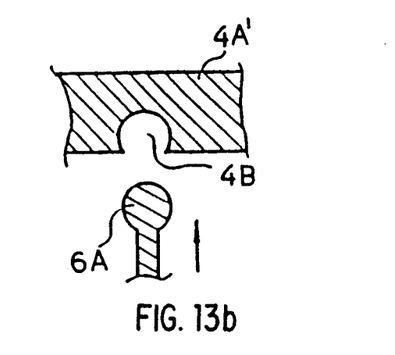
FIG. 13(b) is a sectional view, partially enlarged in scale, of the second embodiment.

FIGS. 13 (a) and (b) show the second embodiment according to which the inflation limiting member 6' is easily removable from the flange portion 4A' of the body 4', and the inflation limiting member 6 has a bulged end 6A which is to be press-fitted into a counterpart concavity 4B formed in the flange portion 4A'.

Figure 14:
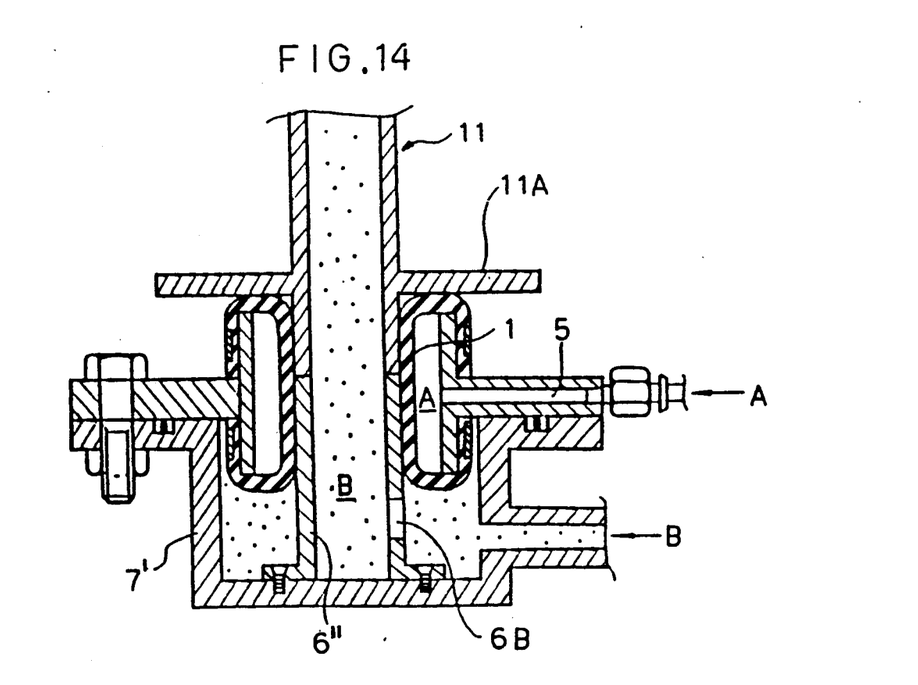
FIG. 14 is a sectional view of a third embodiment of the present invention, showing when it is in used position.

According to the third embodiment shown in FIG. 14, the inflation limiting member 6' is secured to the container 7' and holes 6B are formed at several places in the inflation limiting member 6' to pass the fluid B.

Figure 15:
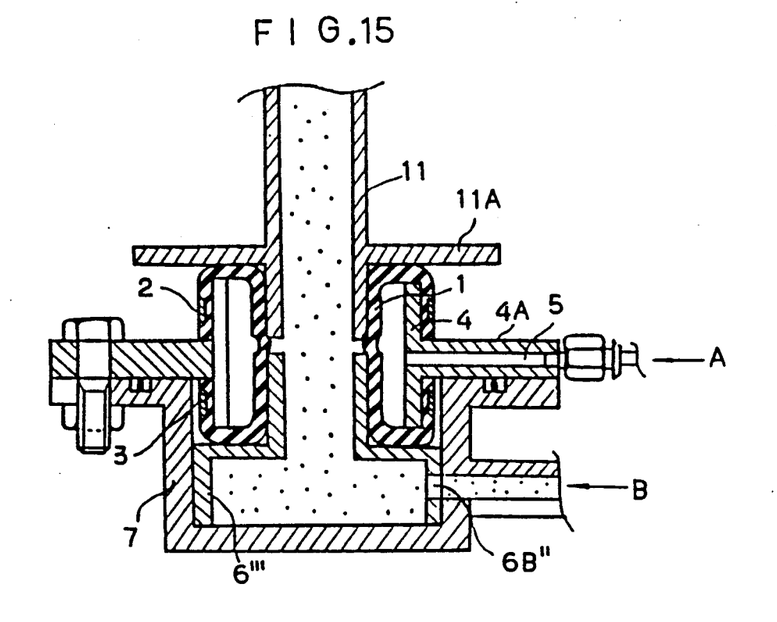
FIG. 15 is a sectional view of a fourth embodiment of the present invention, showing when it is in used position.
Figure 16:
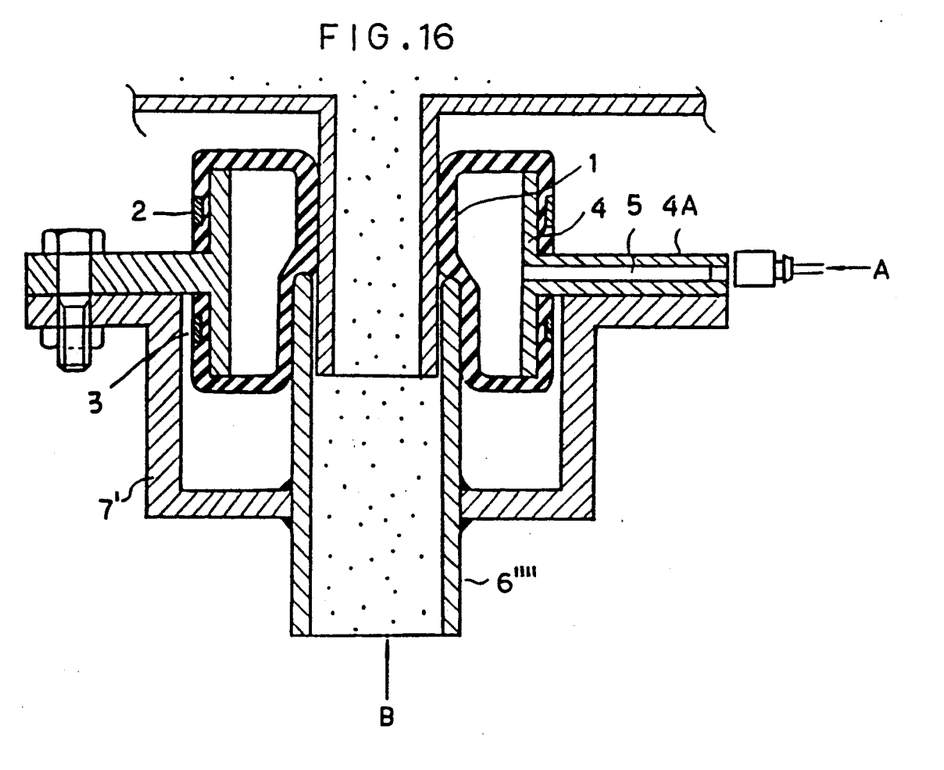
FIG. 16 is a sectional view of a fifth embodiment of the present invention, showing when it is in used position;.

FIG. 15 shows the fifth embodiment according to which the inflation limiting member 6' is secured to the container 7 as in the fourth embodiment but in a different position. Also according to the fifth embodiment shown in FIG. 16, the inflation limiting member 6' is secured to the container 7 in a different place.

In all the above-mentioned embodiments, the tube 1 is inflated inwardly and the fluid B is supplied into the object. Also in case the tube 1' is to be inflated outwardly, however, the inflation limiting member may be provided to permit a secure catching of an object of which the portion to be caught is short. Namely, the present invention is not only applicable for supply of the fluid into the object, but also for catching of an object of which the portion to be caught is short.

Figure 17A:
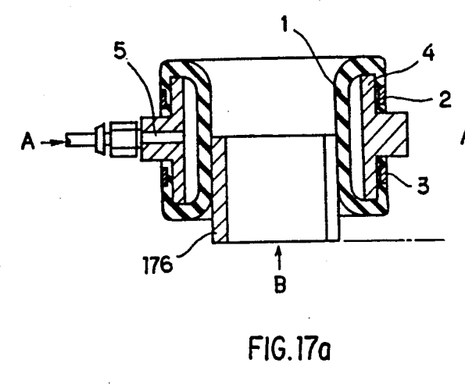
Figure 17B:
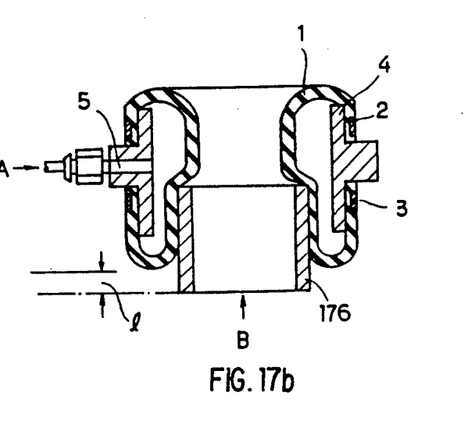

In the sixth embodiment shown in FIGS. 17 (a) and (b), the inflation limiting member 176 is simply inserted into the tube 1, which is different from the above-mentioned embodiments in which the inflation limiting member is secured to the flange portion 4A of the body 4 or to the container 7. According to the sixth embodiment, a pipe is used as the inflation limiting member 176 and the outside diameter of the pipe is selected to be slightly larger than the inside diameter of the tube 1 not yet supplied with the fluid A, so that the pipe inserted once in the tube 1 will not come off. In this catching apparatus, when the tube 1 is inflated as supplied with the fluid A, the pipe being the inflation limiting member 176 is moved downward a distance as shown in FIG. 17 (b). Hence, the upper portion of the tube 1 which is not limited in motion by the pipe becomes free from any slack and is inflated circularly to securely catch the object.

Figure 18:
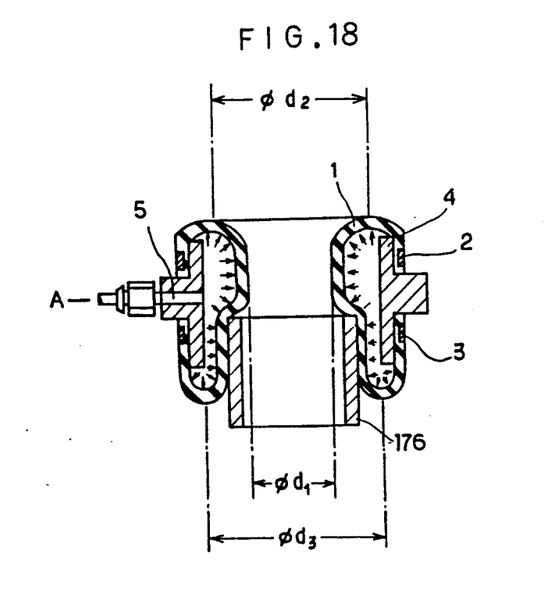
FIG. 18 is a sectional view to explain the supply of fluid in the sixth embodiment.

The pipe forming the inflation limiting member 176 is moved downward when the fluid A is supplied for the following reason: Assume the following as shown in FIG. 18:

$d_1$: minimum diameter of tube 1
$d_2$: effective diameter of upper portion of tube 1
$d_3$: effective diameter of lower portion of tube 1

These factors have the following relation among them:

$$d_1 < d_2 < d_3$$

Assure that the forces acting on the upper and lower portions of the tube 1 are $F_U$ and $F_D$. These parameters $F_U$ and $F_D$ can be expressed as follows:

$$F_U = \frac{\pi}{4}(d_2^2 - d_1^2)P \text{ (pressure)}$$

$$F_D = \frac{\pi}{4}(d_3^2 - d_1^2)P \text{ (pressure)}$$

Therefore, $F_d > F_U$

Figure 19:
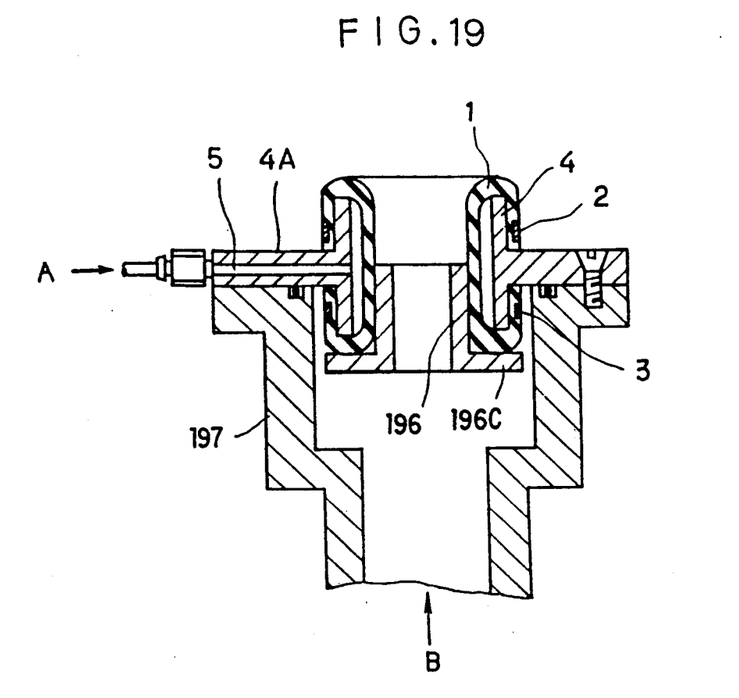
FIG. 19 is a sectional view of a seventh embodiment of the present invention.

According to the seventh embodiment shown in FIG. 19, the inflation limiting member 196C is provided with a flange 196C.

Figure 20:
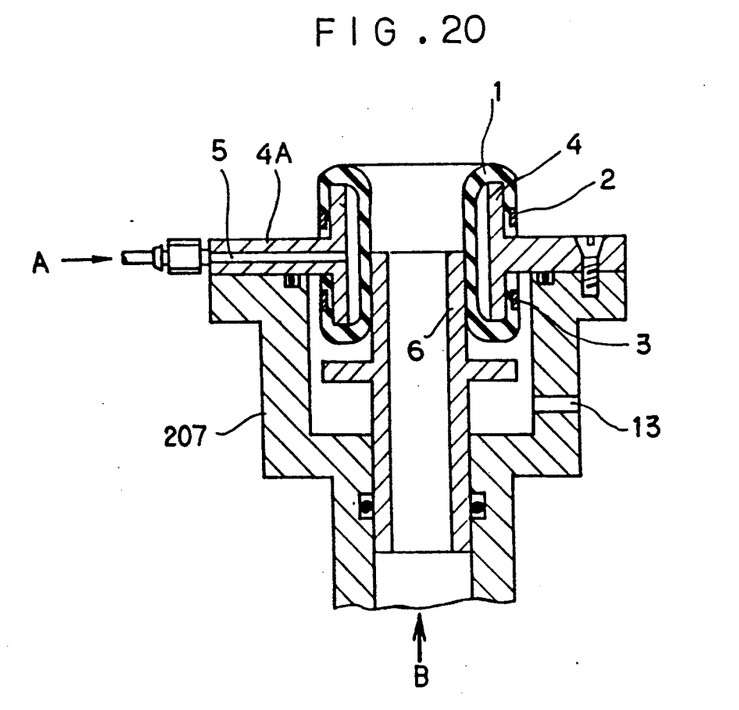
FIG. 20 is a sectional view of an eighth embodiment of the present invention.
Figure 21:
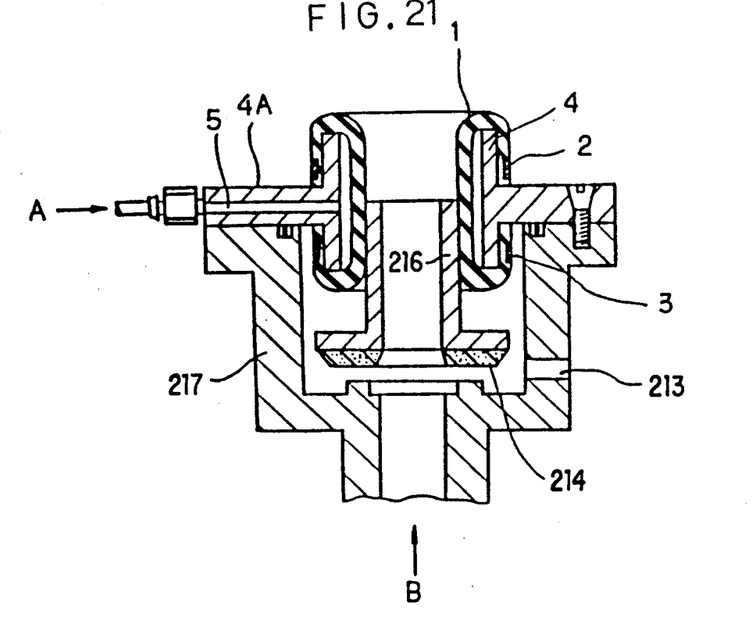
FIG. 21 is a sectional view of a ninth embodiment of the present invention.

In the eighth embodiment shown in FIG. 20, the container 207 has formed therein an air passage 13 for preventing the tube 1 from being difficult to inflate as the pressure of the fluid B rises. Also the ninth embodiment shown in FIG. 21 has a similar function. In this embodiment, when the inflation limiting meber 216 is moved downward, an elastic member 14 adheres to the inner bottom of the container 7 to prevent the fluid B from going into an external air passage.

Figure 22:
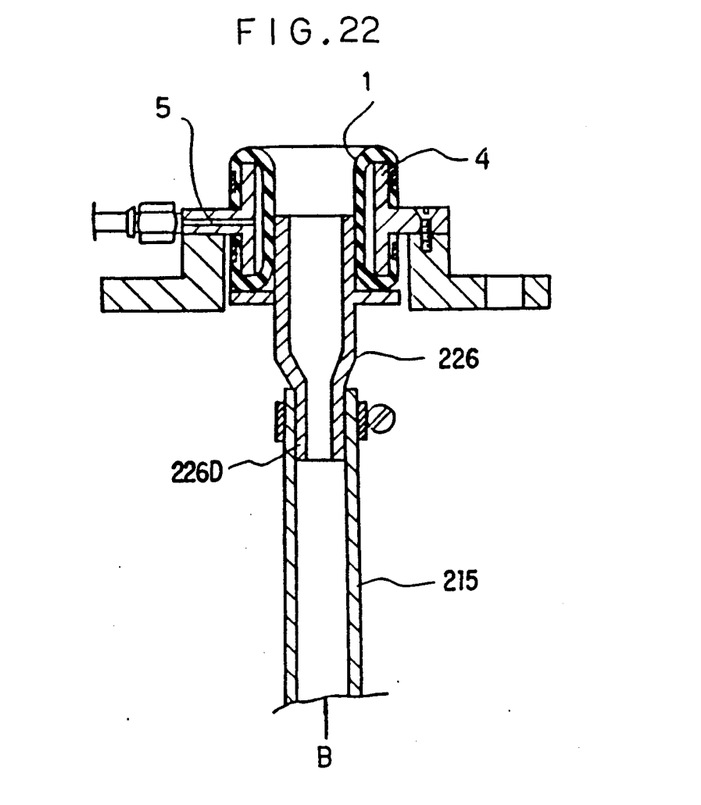
FIG. 22 is a sectional view of a tenth embodiment of the present invention.

According to the tenth embodiment shown in FIG. 22, the inflation limiting member 226 has formed thereon a hose fitting 226D to which a hose 215 for supplying the fluid B is to be connected as fitted.

Figure 23:
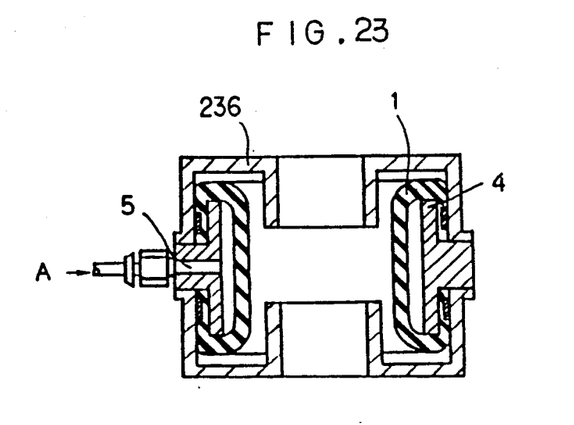
FIG. 23 is a sectional view of a eleventh embodiment of the present invention.
Figure 24:
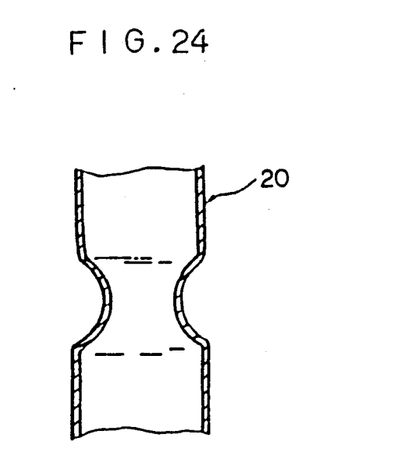
FIG. 24 is a sectional view of an object suitable for catching by the catching apparatus according to the eleventh embodiment.

In the eleventh embodiment shown in FIG. 23, the inflation limiting member 236 is provided on the top and bottom, respectively, of the tube 1 so that the central portion of the tube 1 is more inflated than the rest thereof. This catching apparatus is suitable for use to catch an object 20 shown in FIG. 24.

Figure 25:
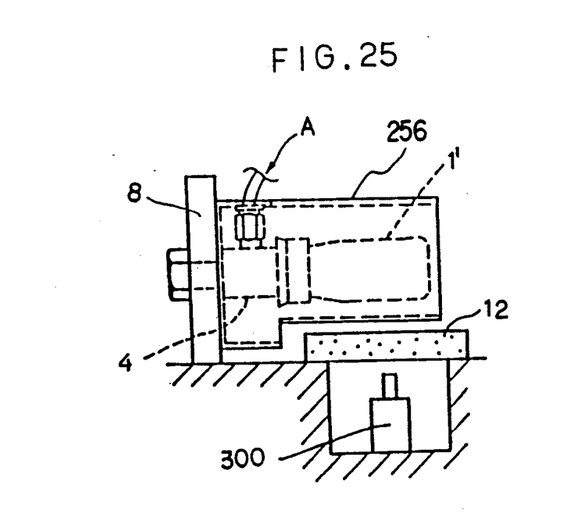
FIGS. 25 to 28 are a side elevation and front view of a twelfth embodiment of the present invention, of which the tube is about to be inflated, and a side elevation and front view of the twelfth embodiment of which the tube has been inflated, respectively.
Figure 26:
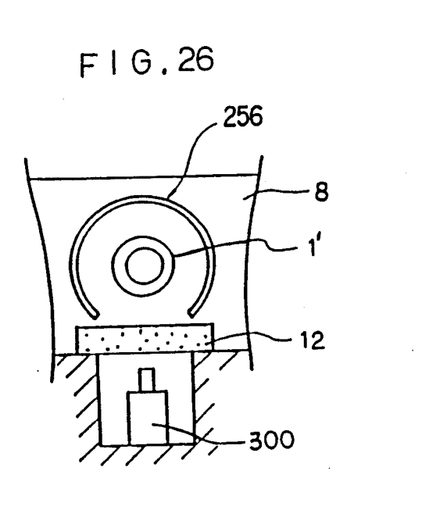
Figure 27:
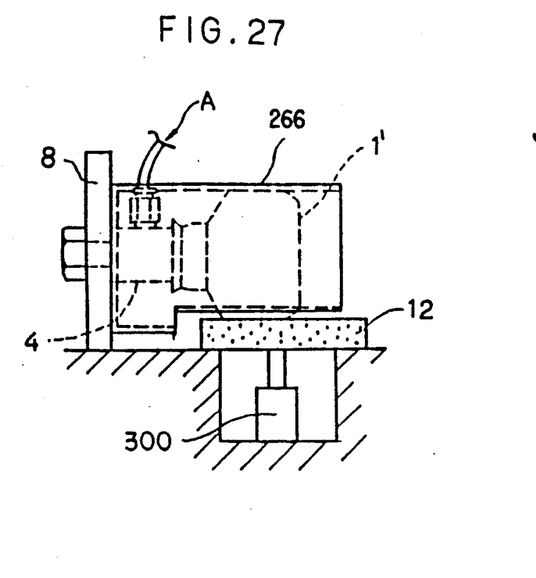
Figure 28:
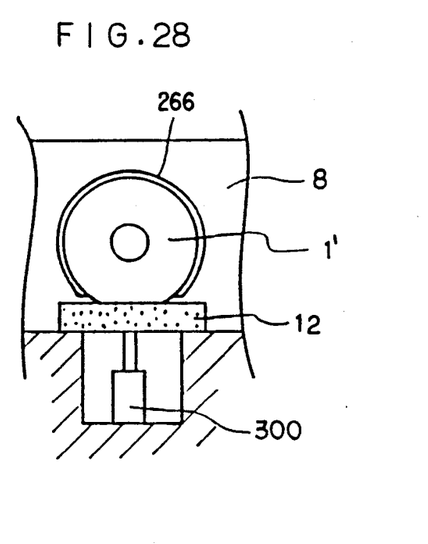
Figure 29:
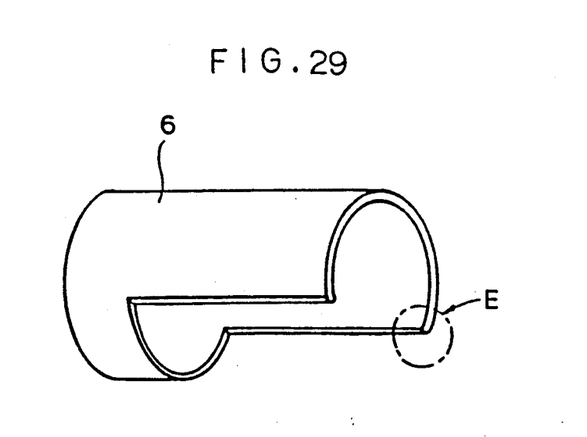
FIG. 29 is a perspective view of an inflation limiting member used in the twelfth embodiment.
Figures 30A, 30B:
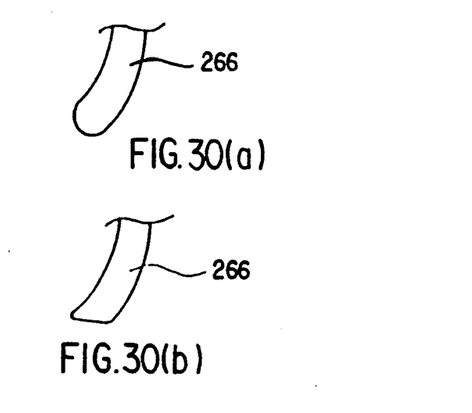
Figure 31:
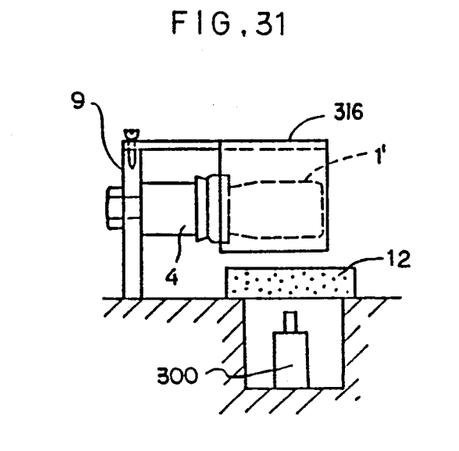
FIG. 31 is a side elevation of a variant of the twelfth embodiment.

According to the twelfth embodiment shown in FIG. 25 et seq., such an arrangement is made that the tube 1' is inflated outwardly and an object 12 is pressed by a part of the inflated tube surface. The object 12 thus pressed is inspected by means of a probe 300. The inflation limiting member 256 is so fixed to a member 8 to which the body 4 is secured as to enclose the inflated surface of the tube 1' which is not in contact with the object 12. The inflation limiting member 256 used as shown in FIGS. 25 to 28 takes a form like a hollow cylinder which is partially cut off as shown in FIG. 29, and the cut edge is rounded as shown in FIG. 30 (a) and (b) to prevent the tube 1' from being broken. FIG. 31 shows a variant of the twelfth embodiment in which the inflation limiting member 316 is fixed to a mount 9 and also it takes another form.

Figure 32:
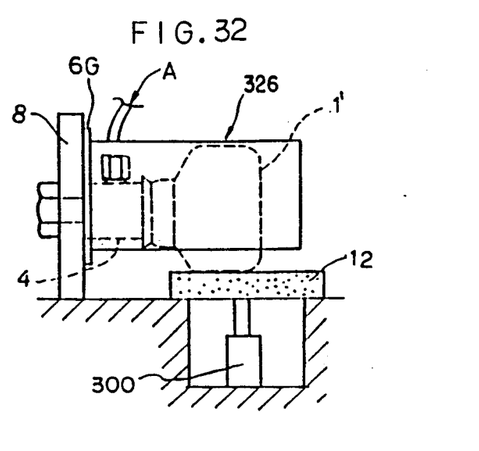
FIGS. 32 and 33 are a side elevation and front view, respectively, of the variant of the twelfth embodiment.
Figure 33:
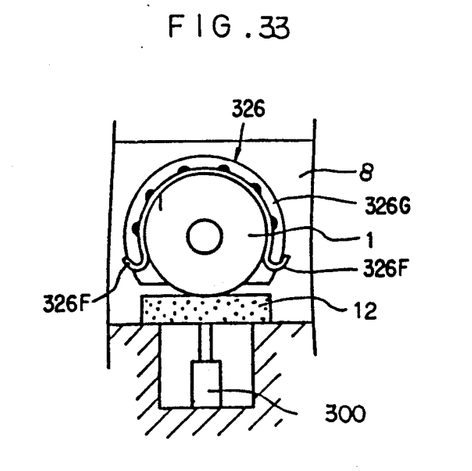
Figure 34:
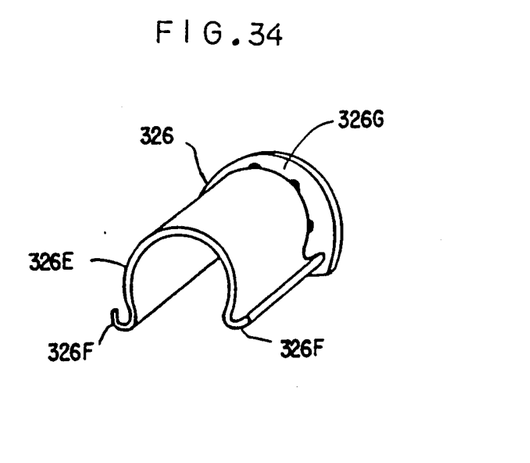
FIG. 34 is a perspective view of an inflation limition member used in the variant of the twelfth embodiment in FIG. 31.

FIGS. 32 to 34 also show another variant of the twelfth embodiment in which the inflation limiting member 326 is made of a press-formed member 326E welded to a plate 326G. The open edge 326F of the pressed member 326E is curved to prevent the tube 1' from being broken. Such inflation limiting member 326 can be fixed to the member 8 together with the body 1'.

What is claimed is:

1. An apparatus comprising an inflatable tube for gripping an object, and an inflation limiting member for limiting inflation of said tube, said apparatus comprising:

a hollow cylindrical body having opposed open ends;
said inflatable tube comprising a cylindrical tube within said body and being adapted to be inflatable inwardly with respect to said body when supplied with a fluid to form an inflated surface, said tube having ends, the ends of said tube being open, folded outwardly over respective opposite ends of said body, and affixed to at least one radially outer surface of said body, whereby a sealed space is defined between said body and said tube, said tube having inflated and uninflated states;
said inflation limiting member having an outside diameter slightly larger than the inside diameter of the tube in its uninflated state and being inserted axially partially into the tube, the inflation limiting member being gripped and thereby supported by the tube regardless of whether the tube is inflated and being otherwise unsupported, whereby when said fluid is supplied into said sealed space, the inflated surface of said tube moves the inflation limiting member axially to decrease the extent of the axial insertion of the inflation limiting member into said tube and the object is gripped by the inflated surface of said tube.

* * * * *